United States Patent [19]
Alston et al.

[11] Patent Number: 5,868,886
[45] Date of Patent: Feb. 9, 1999

[54] Z-PIN REINFORCED BONDED COMPOSITE REPAIRS

[76] Inventors: Mark S. Alston; Joseph P. Brown; James J. Childress, all of The Boeing Company, P.O. Box 3707, M/S 13-08, Seattle, Wash. 98124-2207

[21] Appl. No.: 577,035

[22] Filed: Dec. 22, 1995

[51] Int. Cl.$^6$ .............................. B29C 73/10; B32B 7/08; B32B 35/00
[52] U.S. Cl. ................................ 156/98; 156/94; 156/92; 428/63; 428/223
[58] Field of Search ................................ 156/98, 94, 91, 156/92; 428/63, 119, 223; 29/402.11

[56] References Cited

U.S. PATENT DOCUMENTS

| | | |
|---|---|---|
| 4,152,877 | 5/1979 | Green . |
| 4,560,428 | 12/1985 | Sherrick et al. . |
| 4,588,626 | 5/1986 | Cologna et al. . |
| 4,808,461 | 2/1989 | Boyce ...................................... 156/285 |
| 4,820,564 | 4/1989 | Cologna et al. . |
| 4,824,500 | 4/1989 | White et al. . |
| 4,916,880 | 4/1990 | Westerman et al. ...................... 156/98 |
| 4,961,799 | 10/1990 | Cologna et al. . |
| 4,978,404 | 12/1990 | Westerman et al. . |
| 4,987,700 | 1/1991 | Westerman et al. ...................... 156/98 |
| 5,034,254 | 7/1991 | Cologna et al. . |
| 5,186,776 | 2/1993 | Boyce ........................................ 156/92 |
| 5,190,611 | 3/1993 | Cologna et al. . |
| 5,207,541 | 5/1993 | Westerman et al. .................... 409/179 |
| 5,442,156 | 8/1995 | Westerman et al. . |
| 5,466,506 | 11/1995 | Freitas ..................................... 428/119 |

FOREIGN PATENT DOCUMENTS

| | | |
|---|---|---|
| 38 14 183 | 9/1989 | Germany . |

OTHER PUBLICATIONS

Dastin, "*Repairing Advanced Composite Materials*," 9o3 Machine Design, 58(1986) Feb., No. 4.

Heimerdinger, et al., "Repair Technology for Thermoplastic Aircraft Structures," Advisory Group for Aerospace Development, ACARD, Oct. 1994, Seville, Spain.

*Primary Examiner*—Daniel Stemmer
*Attorney, Agent, or Firm*—John C. Hammar

[57] ABSTRACT

The strength of composite patches is improved over conventional bolted or bonded patches by including Z-pins in the patch/parent structure interface to provide a mechanical link with small stress concentration between the patch and the parent structure. In some cases, we achieve a stronger repair removing the pins to leave holes that fill with resin from the patch during the curing or bonding operation.

20 Claims, 2 Drawing Sheets

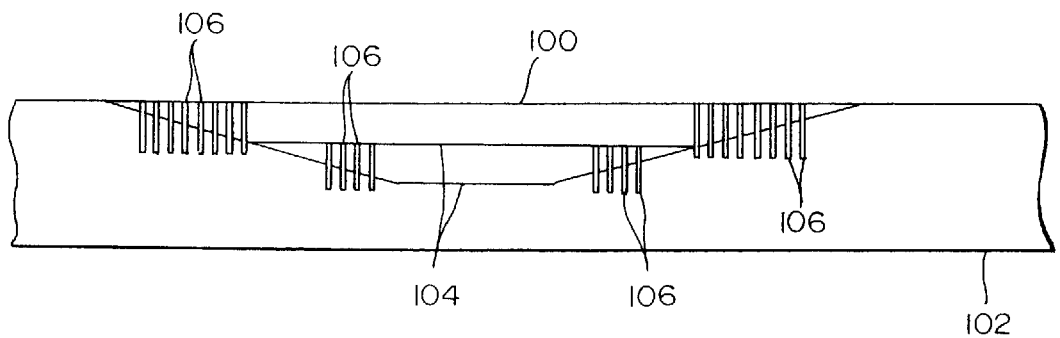
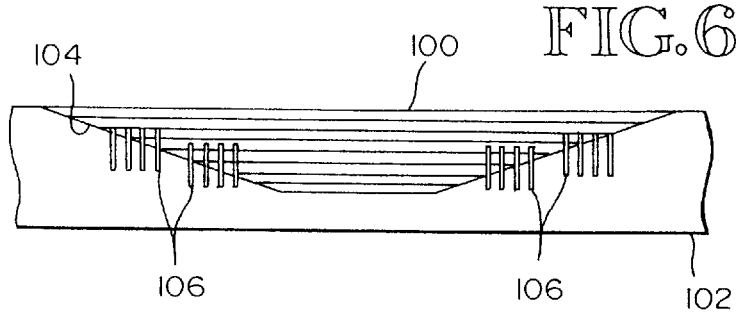

Z-PIN REINFORCED BONDED COMPOSITE REPAIRS

TECHNICAL FIELD

The present invention relates to repair of composite structure, and, more particularly, to a bonded patch for advanced composite structure where the patch is strengthened and reinforced with Z-pins.

BACKGROUND ART

Composite materials are finding broader acceptance and application in industry, especially in modern military and civilian aircraft. High temperature thermoplastic, fiber reinforced composite material possesses high strength, high stiffness, and desirable damage tolerance characteristics. Thermoplastic composites can be made by several low cost manufacturing processes. But, thermoplastic composite material poses challenges for structural repairs, especially field repairs, which are essential if the thermoplastic composites are to find wide scale use. For example, airplanes are too valuable and too expensive to keep grounded for any extended length of time, especially commercial aircraft where grounding for hours has significant commercial repercussions.

Traditionally, field repair of composite structure, whether metal or composite, has used bolted or bonded paths. In the bolted approach, a cover plate is mechanically fastened around the damaged area. The fasteners transfer the loads into the patch, but patches and fasteners create stress concentrations and require the drilling of holes of close tolerance diameter in the parent structure that degrade its performance. Accordingly, bolted repair is unacceptable (or discouraged) for thin skinned or highly-loaded structure. A bolted repair may also adversely impact the aerodynamics or radar signature of an aircraft.

Bonded repairs involve removing the damaged area to prepare an appropriate interface for the patch. The damaged material is usually scarfed away to prepare a tapered or stepped depression in the laminate using the equipment and the processes described in U.S. Pat. Nos. 4,987,700 and 5,207,541, which we incorporate by reference. In some circumstances, the repair hole might be shaped rather than round, as shown in U.S. Pat. Nos. 4,916,880 and 4,978,404, which we also incorporate by reference. Shaped inserts for the patch material often permit load transfer better than plug patches.

In a bonded repair, the cutout is filled with an appropriate uncured, resin prepreg materials which subsequently must be cured or bonded to the parent structure. As appropriate, adhesives are used with the prepreg materials and care is taken to provide load paths in the fiber reinforcement, if possible. These preparations are described in the patents referenced above. Curing or bonding requires heat, which we usually furnish with a thermal diffusion heat blanket, like that described in U.S. Pat. No. 5,442,156, which we also incorporate by reference. Other heaters, of course, might be used. The patch material might be the same material as the parent structure, or, in the present invention, because of the pin-reinforcement, might be a different material, such as a graphite/epoxy patch in a K III B/carbon fiber thermoplastic polyimide parent structure. The ability to use different raw materials in the patch than those used in the parent structure enhances the suitability the present invention for field repair by broadening the candidate patch materials or by reducing the necessary field stores inventory.

Conventional patches usually are selected from materials identical with the materials in the parent structure being repaired. While bonded patches provide more efficient load transfer than bolted repairs and the flush finish is less intrusive from the aerodynamic and signature standpoints, the quality of a bonded repair, like the quality of the parent structure, is highly dependent on the absolute age and the aging history of the prepreg materials used in the patch. In addition, the quality of a conventional bonded patch is also dependent on the interface preparation, on the curing or binding process parameters (including the thermal uniformity), and, finally, on the talent and artistry of the workers preparing the patch. Needless to say, the combination of significant variables makes it difficult to achieve consistent structural performance in the repaired structure.

Conventional bonded repairs are currently an unattractive option for thermoplastic structures, especially those using high temperature thermoplastics. Using thermoplastic adhesives and thermoplastic repair materials would generally damage the parent structure. While thermoplastics can be reheated to their consolidation temperature and reformed a number of times, at the temperature required to cure the high temperature thermoplastic repair material, the parent structure would begin to soften and reconsolidate. Often the parent components are originally consolidated at high pressures often using complex tooling to achieve critical shaping and dimensions necessary for performance. Reconsolidation under field conditions would be impractical. Loss of the critical dimensions could be catastrophic. Thermoplastics are also difficult to repair using adhesive bonding because the thermoplastic resins often are resistant to solvents and adhesives. As a result, conventional bonded repairs to these thermoplastic structures produce inferior performance.

For advanced thermoplastic composites to be adopted widely for emerging, industrial (especially aerospace) structural applications (the uses for which the materials are designed), industry must improve the quality of field repairs and reduce the extensive "logistics tail" typically associated with composite structures. Repair approaches must be identified and developed which strike a balance between the time and resources associated with their use and the structural and aerodynamic performance they provide.

Previous work has concentrated primarily on improving the performance of bonded repairs. Work done to enhance bond strength has centered around improving the prebonding surface preparation processes. Many different approaches have been pursued including plasma spray, chemical etch, and corona treatment (electrical discharge over part-surface). These methods are neither user friendly nor readily field applicable. They often fail to produce improvements in repair strength consistently. Other joining processes attempted for thermoplastic repair include welding, which entails heating the interface between the parent structure and patch to a temperature high enough to cause the materials to both melt and to reconsolidate together. For high temperature thermoplastics, welding requires elevated temperatures and high pressure to be applied to the parts which usually makes the process unattractive for field repair. We describe welding operations in U.S. Pat. Nos. 5,313,037, and 5,444,220 U.S. patent applications 08/367,546; 08/352,991, and 08/367,557. Although not necessarily field repair processes, we incorporate these patents and applications by reference.

Improvements are still required for bonded field repairs of aircraft to produce adequate patches easily, reliably, and reproducibly to return the aircraft quickly to service (at least temporarily). We have discovered that incorporating Z-pins in the repair provides structural improvement and permits broader processing windows for otherwise critical preparation variables. Z-pin patches also permits field repair of advanced thermoplastic structure using otherwise incompatible thermosetting graphite/epoxy patches.

SUMMARY OF THE INVENTION

The present invention combines Z-pinning with bonding to provide a quality field repair of composite material systems. Our repair concept, applicable to both thermosetting and thermoplastic structures, has elements of both mechanically fastened and adhesively bonded repair approaches, but is unique from any past hybrid repair approach. We generally use ultrasonically inserted metal pins to strengthen an otherwise conventional bond line. Because of the relatively large number of pins used, stress concentrations are minimized compared to fastened patches. In addition, the small pin size and method of insertion minimize fiber breakage in the parent structure reducing the associated structural degradation.

In some cases, we remove some or all of the Z-pins before completing the bonding. The small holes in the repair that remain upon pulling the pins fill with resin when the resin flows. Surprisingly, we achieve superior load carrying capacity over Z-pinned patches or conventional bonded patches.

Therefore, the present invention is a bonding method to prepare improved patches in bonded repairs of aircraft composite structure. After preparing the patch interface by cutting away the damaged area and laying in the prepreg patch, we insert Z-pins with an areal density in the range of about 0.375–1.50% (i.e., pins spaced in a regular array between about 0.0625–0.25 inches apart) in all or a portion of the patch material and cure the patch prepreg to complete the bonding. For example, for repair of thermoplastic parent structure, the patch prepreg might be a thermoplastic that matches the parent structure or may be a thermoset material otherwise incompatible with the parent structure. In some cases we remove the pins prior to curing the prepreg/adhesive.

BRIEF DESCRIPTION OF THE DRAWINGS

FIG. 5 is a schematic sectional view of a multilayered Z-pinned patch.

FIG. 6 is a schematic sectional view of a patch having inner plies pinned while surface plies are free of pins.

DETAILED DESCRIPTION OF A PREFERRED EMBODIMENT

Figure 1:
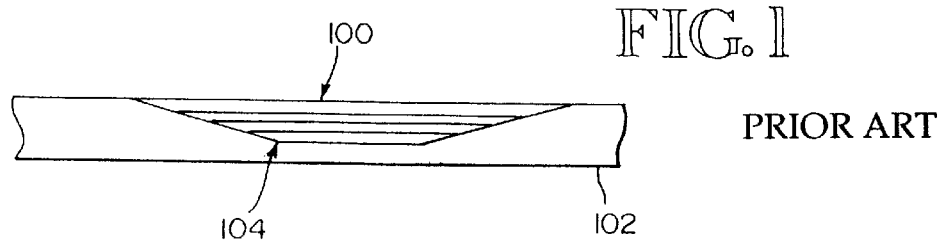
FIG. 1 is a schematic sectional view of a typical, prior art patch.

The present invention is a Z-pinned patch for composite structure to provide improved patch strength and load transfer without stress concentration. The pinned patch is compatible with existing composite structure and existing repair techniques but is particularly suited for field repair of thermoplastic fiber-reinforced composite structure, and, particularly, for field repair of such composite structure on military or civilian aircraft.

Incorporating the Z-pinning process into the repair environment will have a minimal impact to the present "logistics tail" or repair resource requirements. Our approach can use any prepreg or wetted fabric repair materials as well as precured thermoplastic patches. Accomplishing the Z-pinning portion of the repair requires about the same amount of time as performing typical surface preparation operations. The existing repair work force can use the process in the present, austere field repair environment. Other than the Z-pinning apparatus and pins, all other support equipment and materials required for the process are typical of those currently used.

Z-pinned patches will provide new capabilities for repair personnel. The Z-pinned repair will provide the ability to perform consistent, quality repairs to both thermoplastic and thermosetting composite material while using currently existing repair resources, and will include the ability to repair welded thermoplastic primary structures. We can add Z-pins to current disbond and delamination repairs for added structural restoration. We can also use Z-pinned patches for accomplishing rapid repairs and for battle damage repair. Quality rapid repairs are extremely important both to the military and commercial to airlines for repair of primary composite structures such as the stabilizers on the 777 airliner, because rapid repairs return the aircraft to service.

By Z-pinning, we mean the technique of introducing fiber reinforcement in the Z-direction of the fiber reinforced composite structure through normal or interlaced pins arranged with an areal density of about 0.375–1.5%, although higher and lower densities or graded densities might also work. Z-pinning is described in greater detail in U.S. patent application 08/582,297 entitled "Pin-Reinforced Sandwich Structure" by Jamie Childress, which we incorporate by reference.

The configuration and process for accomplishing a Z-pinned repair are similar to those of a conventional bonded repair. The only additional equipment and supplies required for the repair are an ultrasonic horn (or an equivalent means for inserting the pins) and a supply of Z-pins. Suitable Z-pins currently come preinserted in a foam matrix from Foster-Miller. The rest of the materials and equipment required are identical to those already used for bonded repairs in the field and the depot maintenance environment. The proposed configuration of the ultrasonic horn is quite similar to existing, field capable ultrasonic cutters and welders, although we used a horn best suited for welding metals in the test panels we have repaired to date.

As shown schematically in FIG. 1, a patch requires scarfing away of the damaged area to expose the fiber reinforcement of the separate laminate layers of parent composite structure 102 either in a tapered or stepped cut with the subsequent insertion of a patch together with an adhesive 104, as appropriate, along the bond line (i.e., the interface). The patch 100 is flush with the outer, exposed surface of the parent structure 102. The hot melt or thermally activated adhesive 104 glues the cured patch to the parent structure 102.

Figure 2:
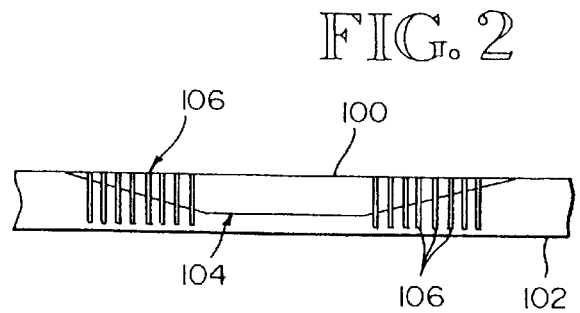
FIG. 2 is a schematic sectional view of a Z-pinned path of the present invention.

FIG. 2 illustrates a Z-pinned patch using precured thermoplastic material for the patch 100. The patch 100 is first cut to fit the damage area either as a scarfed patch, as shown, or an external "scab" patch. A layer of adhesive 104, optionally, is applied to the parent structure 102 in the form of film or paste. The precured patch 100 is then seated against the parent structure 102. The Z-pins 106 are inserted through the patch 100 and into the parent structure 102 using an ultrasonic horn. The adhesive 104 bonds, seals, and shims the patch 100 to ensure superior fitup. We cure the adhesive using a heat blanket controlled by a hot bonder but could substitute any other suitable heater. We might use ambient temperature curing adhesives for applications requiring quick turn around or for making repairs in austere repair environments which lack support resources. The pins 106 will hold the patch firmly in place and will, in many cases, supply enough structural capability to put the vehicle back in service immediately allowing the patch to "cure on the fly." For applications where patch thickness requirements exceed the usable pin length, we use multiple, staggered patch layers, as shown in FIG. 5. A typical heat blanket is described in U.S. Pat. No. 5,442,156, which we incorporate by reference.

Instead of using precured thermoplastic material matching the parent structure, we can use thermosetting material in the patch. For example, we might use Boeing BMS 8-212 or BMS 8-297 graphite/epoxy for a patch and for the bondline adhesive in K III B polyimide thermoplastic parent structure with steel pins at an areal density of about 0.375% (i.e., 0.25 inches apart) These graphite/epoxy patches are already stocked in most military depots. Therefore, their application to high temperature thermoplastic composite repairs reduces the "logistics tail." It also shows the versatility of the repair process of the present invention.

An alternative multilayer pin patch (FIG. 5) staggers the Z-pins along the tapered interface, but requires that the patch inlay be applied in separate pieces. If desired, we can use an adhesive 104 between layers of the patch or additional pins 106 to tie the separate pieces together, or both.

Figure 3:
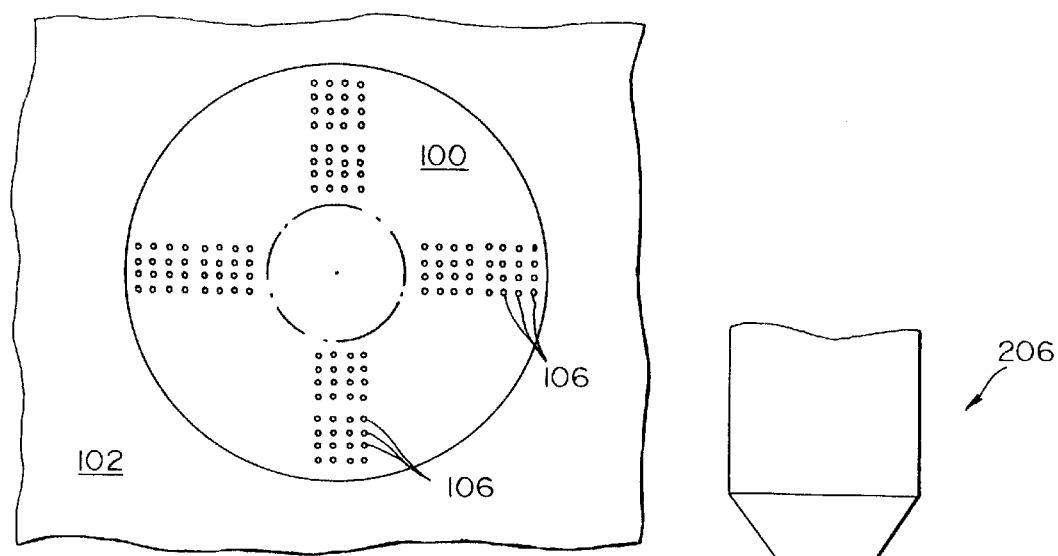
FIG. 3 is a schematic plan view of the repair area of FIG. 2 showing the distribution of Z-pins.

The pins may be metal (such as steel, copper, or titanium) glass, graphite, or carbon fibers of appropriate length. We prefer titanium to eliminate galvanic corrosion but the repair cost is higher. Exemplary pin diameters are in the range of about 0.010–0.030 inches and the pins typically are about 0.100 to 0.500 inches in length. The pins should have a Young's modulus of elasticity of at least about $10^7$. The pins can be barbed, if appropriate, to further enhance pulloff strength. The pins typically are spaced in a regular array at a center-to-center spacing density of about 0.0625–0.25 inches, although other arrangements and pin densities might be used. We can cover the entire area of the interface or over a subportion, as shown in FIG. 3 where four areas of pins along orthogonal axes are centered symmetrically on the repair area and oriented with the reinforcing fibers in the underlying laminates or parallel and orthogonal to the reinforcing fibers in the case of a laminate made with unidirectional tape or tow.

Another repair alternative is shown in FIG. 6 where we inserted pins in the inner plies of uncured patch material (rather than precured material as with the other options), but pins are not used with the surface plies. While the pins are being inserted, the heat they generate along with the ultrasonically induced vibration cause adhesive resin to wick along the pin, which serves to anchor the pins in the parent material more securely. If desired, all the repair plies can be positioned before inserting the pins. In addition, the ability to trim the pins and place one or two plies over them is probably provides aesthetic, electro-magnetic energy (lightning strike and electrostatic discharge) and low observable benefits.

We have tested the embedded pin embodiment shown in FIG. 6 in a simulated repair using 16-ply K-III B thermoplastic polyimide flat composite coupons reinforced with graphite fiber. The coupons were bevel cut through 8 plies to simulate a scarf and filled with BMS 8-297 graphite/epoxy patch material and 10 mils of BMS 8-245 adhesive in the bondline. We inserted steel Z-pins in the pattern illustrated in FIGS. 3 and 6 and at an areal density of about 0.375% (0.25 in spacing). We conducted tensile strength tests on coupons cut from the pinned specimen to determine whether we achieved bond line strengthening over similar specimens lacking the pins. We received a significant increase in the repair strength with the average load carrying capacity of the patch increasing at least about 1000 lbs to an absolute strength of about 6400–7500 lbs from the performance of a bonded patch, irrespective of the special surface treatments for such pin-free patch. In several of our tests, the parent structure failed before the pinned patch. Our results are summarized in Table 1.

We also tested specimens where we removed the pins after inserting them to leave an array of holes in the patch-parent materials along the bond line. For these specimens, we inserted pins in the same manner as we did for the pinned specimens, but we removed all the pins before completing the bonding. The holes we formed filled with resin during the cure cycle when the matrix resin flowed to form resin pillars between plies. To our surprise, in tensile tests, the pinless patches carried even higher loads than those having pins with load strengths in the range of 7200–8300 lbs. We attribute the improved strength to better bonding between the resin of the filled holes and the matrix than we achieved between the matrix resin and the steel pins in the pinned specimen, although we have not studied the phenomenon in detail and do not wish to be limited to this theory. The resin is a common, (e.g., more compatible or less invasive) material in the composite rather than a foreign material like steel or the resin is homogeneous with the laminate's resin.

TABLE 1

| Sample | Maximum Load (lbs) | Remarks |
|---|---|---|
| 1. | 6467 | pinned |
| 2. | 6431 | pinned |
| 3. | 7375 | pinless |
| 4. | 6919 | pinned |
| 5. | 5572 | pinned (badly warped) |
| 6. | 7481 | pinned |
| 7. | 8272 | pinless |
| 8. | 7240 | pinless |

Key:
"Pinned" means the patch had stainless steel pins in a 0.25 in spaced grid.
"Pinless" means that pins were inserted at the spacing of "pinned" patches, but were removed prior to curing.
Patent structure: K-IIIB/graphite fiber (16 plies)
Patch repair material: BMS 8-297
Bondline adhesive: BMS 8-245 (10 mils)
Surface preparation: hand sand; wipe with MEK (methylethyl ketone)
Cure temperature: 350° F. (heat blanket)
Load was measured following an environmental soak (160 F & rel. humidity 85%)

These test results are compared against the following data:

TABLE 2

| Sample | Maximum Load (lbs) | Remarks |
|---|---|---|
| Unrepaired damage | 2900 | Scarfed; unpatched |
| Undamaged | 9500 | |
| BMS 8-212/8-245 patch | 5350 | No pinning; abrasive blast surface prep. |

In all cases, Z-pinning provided higher strength than a conventional patch and as high as about 87% of the strength of undamaged structure.

Typically about 75% or more of the intended pins were inserted with the remainder being lost during the insertion process. Samples 5–8 were cut off center leaving only about ½ of the pins the coupon in comparison with the number in samples 1–4.

Without surface preparation, a pinned patch failed at low loads, so at least simple surface preparations like handsanding and MEK washing likely will remain as important repair steps.

Figure 4:
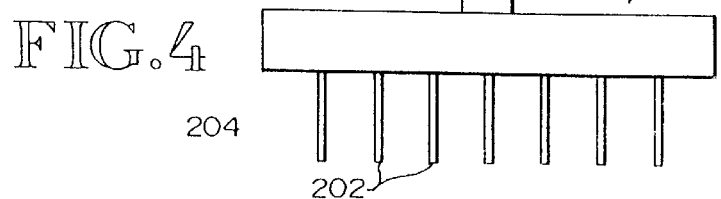
FIG. 4 is a schematic illustration of an ultrasonic horn having a pin fixture attachment for placing the Z-pins or Z-pin holes in the repair area.

When making pinless patches, instead of inserting individual pins and subsequently removing them one at a time (as we did with our test) with pliers, we can use a pin fixture attachment to create all the holes at one time with easy removal. In the pin fixture attachment 200 (FIG. 4), high strength pins 202 are mounted permanently in a plate 204 that attaches directly to the ultrasonic horn 206. Ultrasonic vibration from the horn assists both inserting and removing the pins 202 from the part. Since the pins 202 do not need to go entirely through the repair material and the part, they can be somewhat shorter on the attachment 200 than the regular pins (approximately ⅛ inch long) which would make them less susceptible to damage during repeated use. The attachment's main advantage would be in reducing or eliminating the need for an inventory of consumable pins. It would also speed up the process of inserting and removing the pins.

A pinless patch with resin filled holes carried about a 10–20% greater load than our pinned patch.

Of course, we might also make a hybrid patch having some pins and some holes. For example, we might insert pins on the inner plies and leave them in place while using the pin-free strength enhancement in the surface plies. Or, we might insert a lower density of pins while making holes in the other locations to retain a pin-hole areal density in the range we previously described.

The composite might be a metal/reinforced resin matrix composite laminate having alternating layers of metal foil, like titanium, with a composite, such as thermosetting epoxy or K-IIIB thermoplastic polyimide.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. A method for patching a laminated composite structure, comprising the steps of:
    (a) scarfing the composite structure in a repair area to expose a patch interface through at least one ply of the composite structure;
    (b) applying fiber-reinforced, resin-matrix composite patch material along the interface to restore the composite structure in the repair area;
    (c) optionally, applying an adhesive between the patch material and composite structure on at least a portion of the interface;
    (d) inserting Z-pins along at least a portion of the interface to connect between the patch material and the composite structure to pin the patch material to the composite structure;
    (e) removing at least a portion of the Z-pins to leave spaced holes between the patch material and composite structure; and
    (f) bonding the patch material to the composite.

2. The method of claim 1 wherein the pins are inserted at an areal density of about 0.375–1.5%.

3. The method of claim 2 wherein the patch material is applied in at least two plies and wherein inserting the Z-pins is done in a subportion of the repair area by inserting the Z-pins separately at different locations in the repair area for each ply of the patch material.

4. The method of claim 3 further comprising the step of applying at least one, pin-free surface ply over the pinned patch material.

5. The method of claim 4 wherein the composite structure is a metal foil—resin matrix composite laminate.

6. The method of claim 4 wherein the composite structure includes a thermoplastic resin and the patch material includes a thermoset resin.

7. The method of claim 4 wherein bonding includes heating the patch material to at least about 250° F.

8. The method of claim 7 wherein the composite structure is a portion of an aircraft and wherein the steps are carried out in a field repair of the aircraft.

9. The method of claim 2 wherein the Z-pins have a diameter in the range of 0.010–0.030 inches, a length of about 0.1–0.5 inches, have a Young's modulus of at least $10^7$, and, optionally, are barbed to enhance pulloff strength.

10. The method of claim 1 wherein bonding includes heating the patch material to at least about 250° F.

11. A method for patching a laminated composite structure, comprising the steps of:
    (a) scarfing the composite structure in a repair area to expose a patch interface by scarfing through at least one ply of the composite structure;
    (b) filling the repair area with patch material in a plurality of plies along the interface to restore the composite structure;
    (c) optionally, applying an adhesive between the patch material and composite structure on at least a portion of the interface;
    (d) inserting Z-pins along at least a portion of the interface to connect the patch material with the composite structure;
    (e) removing at least a portion of the Z-pins to leave spaced holes in the patch material and composite structure along the interface; and
    (f) bonding the patch material to the composite structure to have the matrix resin of the patch material flow into the holes to form resin pillars between plies.

12. The method of claim 11 wherein the pins are inserted at an areal density of about 0.375–1.5%.

13. The method of claim 11 wherein the bonding step includes applying sufficient heat or sufficient pressure or both heat and pressure to consolidate the patch material and to create a bond to the composite structure.

14. The method of claim 13 wherein the composite structure is a portion of an aircraft,
    wherein the patching steps are carried out in a field repair, and
    wherein the composite structure is a plurality of plies of cured and consolidated, fiber-reinforced resin matrix composite material or a metal foil—resin matrix composite laminate.

15. A method for patching a laminated composite structure, comprising the steps of:
    (a) scarfing the composite structure in a repair area to expose a patch interface through at least one ply of the composite structure wherein the interface is a bevel cut in the composite structure penetrating only part way through the composite structure;

(b) preparing the interface for adhesive bonding following the scarfing step;

(c) applying fiber-reinforced, resin-matrix composite patch material along the interface to restore the composite structure in the repair area;

(d) applying an adhesive between the patch material and composite structure on at least a portion of the interface, (e) inserting Z-pins along at least a portion of the interface to connect between the patch material and the composite structure to pin the patch material to the composite structure;

(f) removing at least a portion of the Z-pins to leave spaced holes between the patch material and composite structure; and (g) bonding the patch material to the composite.

16. A method claim for patching a laminated composite structure, comprising the steps of:

(a) scarfing the composite structure in a repair area to expose a patch interface through at least one ply of the composite structure;

(b) applying fiber-reinforced, resin-matrix composite patch material along the interface to restore the composite structure in the repair area;

(c) optionally, applying an adhesive between the patch material and composite structure on at least a portion of the interface;

(d) inserting Z-pins along at least a portion of the interface to connect between the patch material and the composite structure to pin the patch material to the composite structure;

(e) optionally, removing at least a portion of the Z-pins to leave spaced holes between the patch material and composite structure; and (f) bonding the patch material to the composite, wherein the patch material is applied in at least two portions by layering plies of the composite patch material and inserting the Z-pins is done separately at different locations for each portion.

17. A method for patching a laminated composite structure, comprising the steps of:

(a) scarfing the composite structure in a repair area to expose a patch interface through at least one ply of the composite structure;

(b) applying fiber-reinforced, resin-matrix composite patch material along the interface to restore the composite structure in the repair area;

(c) optionally, applying an adhesive between the patch material and composite structure on at least a portion of the interface;

(d) inserting Z-pins along at least a portion of the interface to connect between the patch material and the composite structure to pin the patch material to the composite structure;

(e) optionally, removing at least a portion of the Z-pins to leave spaced holes between the patch material and composite structure;

(f) applying at least one, pin-free surface ply over the pinned patch material; and (g) bonding the patch material to the composite.

18. The method of claim 17 wherein the composite structure is a portion of an aircraft and wherein the patching steps are carried out in a field repair of the aircraft.

19. A method for patching a laminated composite structure, comprising the steps of:

(a) scarfing the composite structure in a repair area to expose a patch interface through at least one ply of the composite structure;

(b) applying fiber-reinforced, resin-matrix composite patch material along the interface to restore the composite structure in the repair area;

(c) optionally, applying an adhesive between the patch material and composite structure on at least a portion of the interface;

(d) inserting Z-pins along at least a portion of the interface to connect between the patch material and the composite structure to pin the patch material to the composite structure;

(e) optionally, removing at least a portion of the Z-pins to leave spaced holes between the patch material and composite structure; and (f) bonding the patch material to the composite, wherein the composite structure is a metal foil—resin matrix composite laminate.

20. A method for patching a laminated composite structure, comprising the steps of:

(a) scarfing the composite structure in a repair area to expose a patch interface through at least one ply of the composite structure;

(b) applying fiber-reinforced, resin-matrix composite patch material along the interface to restore the composite structure in the repair area;

(c) optionally, applying an adhesive between the patch material and composite structure on at least a portion of the interface;

(d) inserting Z-pins along at least a portion of the interface to connect between the patch material and the composite structure to pin the patch material to the composite structure;

(e) optionally, removing at least a portion of the Z-pins to leave spaced holes between the patch material and composite structure; and (f) bonding the patch material to the composite, wherein the composite structure includes a thermoplastic resin and the resin of the patch material is a thermoset.

* * * * *